No. 806,584. PATENTED DEC. 5, 1905.
G. N. SHEPPARD.
WHEEL.
APPLICATION FILED JULY 18, 1905.
2 SHEETS—SHEET 1.
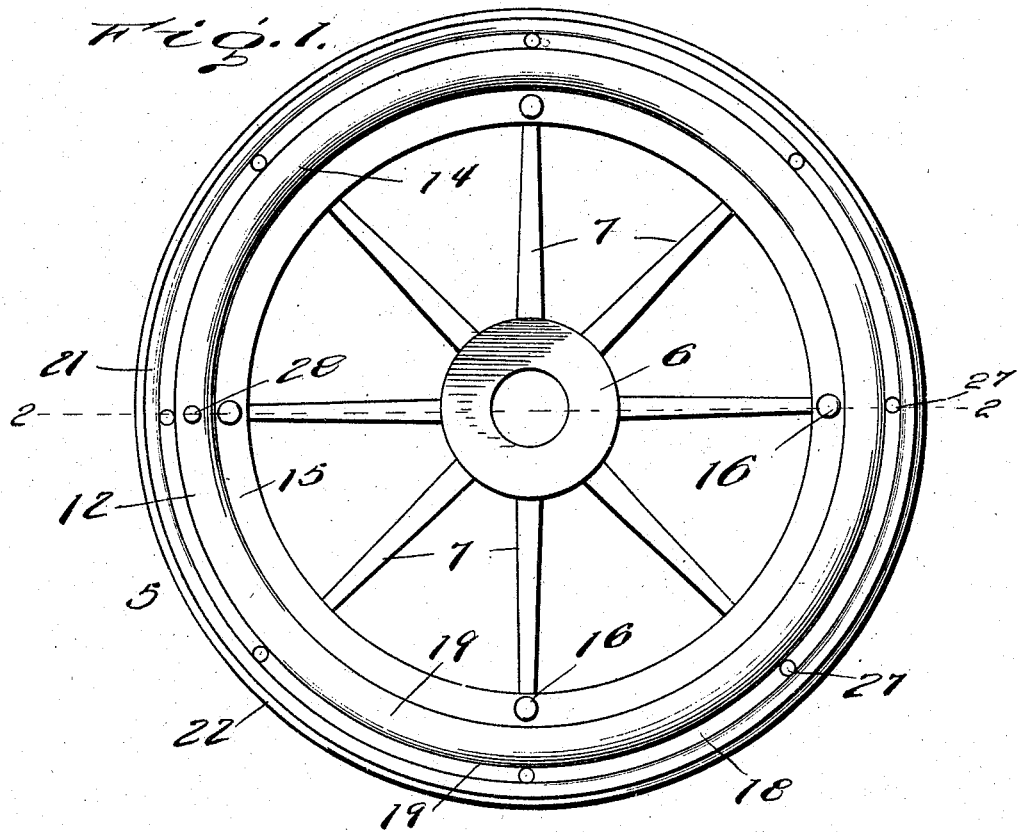
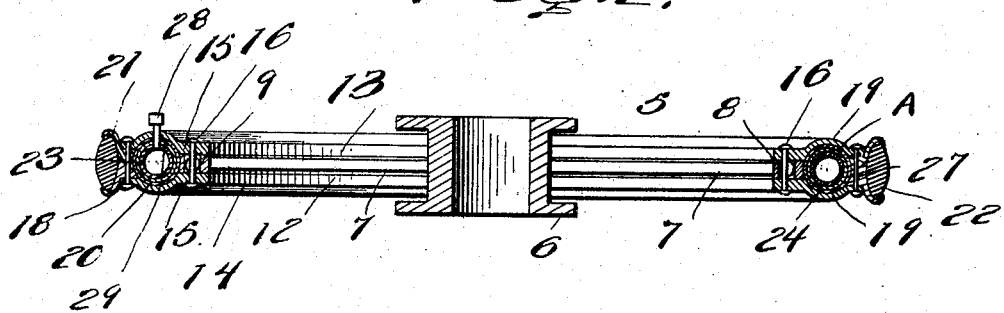
Witnesses
G. R. Thomas
E. M. Colford
Inventor
G. N. Sheppard
By Chandler & Chandler
Attorneys

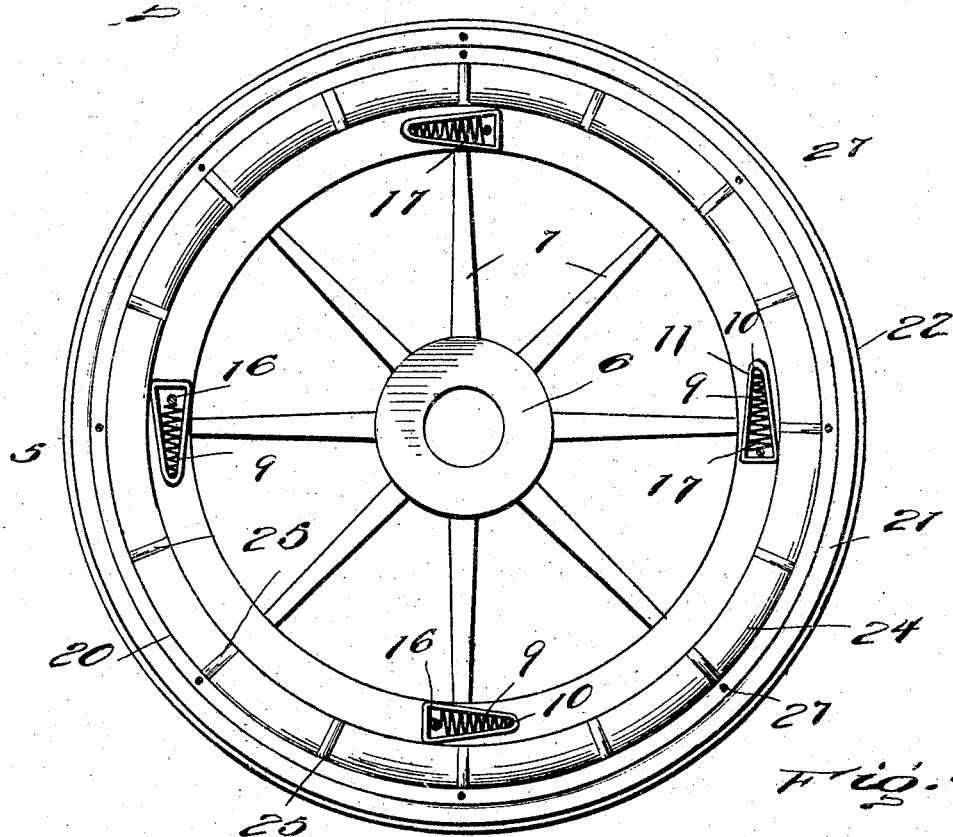
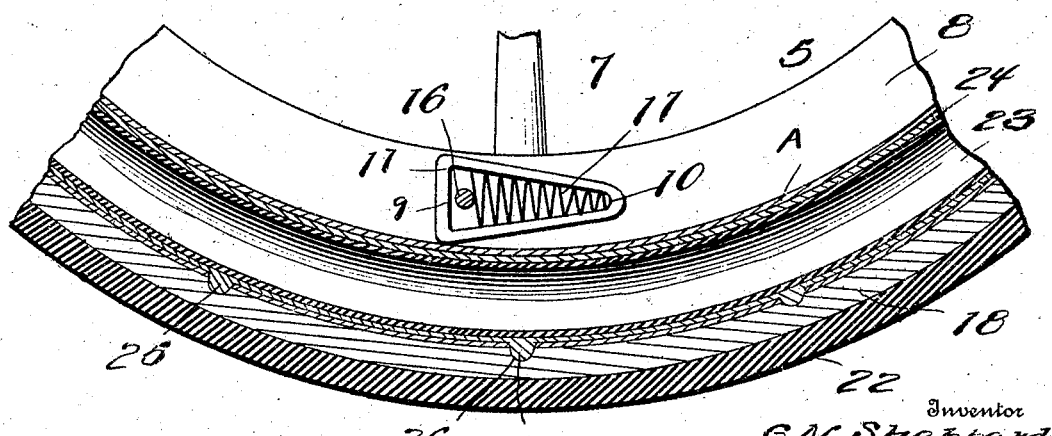

UNITED STATES PATENT OFFICE.

GEORGE N. SHEPPARD, OF FILLMORE, MINNESOTA.

WHEEL.

No. 806,584.          Specification of Letters Patent.          Patented Dec. 5, 1905.

Application filed July 18, 1905. Serial No. 270,277.

*To all whom it may concern:*

Be it known that I, GEORGE N. SHEPPARD, a citizen of the United States, residing at Fillmore, in the county of Fillmore, State of Minnesota, have invented certain new and useful Improvements in Wheels; and I do hereby declare the following to be a full, clear, and exact description of the invention, such as will enable others skilled in the art to which it appertains to make and use the same.

This invention relates to wheels, and more particularly to cushion-wheels, and has for its object to provide a wheel including a pneumatic cushion, the latter being arranged to take up jar received by the wheel, a further object being to provide a wheel of this kind so arranged as to reduce wear of the parts, and thus prolong the life thereof.

Other objects and advantages will be apparent from the following specification, which describes an embodiment of the present invention.

In the drawings forming a portion of this specification, and in which like numerals of reference indicate similar parts in the several views, Figure 1 is a side elevation of the present wheel. Fig. 2 is a section on line 2 2 of Fig. 1. Fig. 3 is a side elevation with one portion of the casing removed. Fig. 4 is a central vertical section of the wheel.

Referring now to the drawings, the present invention comprises a wheel proper, 5, including a hub 6, spokes 7, and a felly 8, and formed transversely through the latter there are a plurality of triangular openings 9, which have their apices 10 turned in the same direction circumferentially of the wheel. Metallic lining-strips 11 are provided for these openings.

An outer casing 12 is provided which consists of two sections 13 and 14, respectively, which are circular in form and which have inwardly-extending flanges 15 disposed against the felly 8, and the flanges 15 of the two sections are connected by bolts 16, which are engaged therein and which lie within the openings 9, the outer casing being thus shiftable upon the wheel 5, this movement being limited by the ends of the openings 9, and to hold the bolts yieldably at the major ends of the openings 9 helical springs 17 are engaged between these bolts and the minor ends of the openings.

Each of the sections 13 and 14 of the outer casing includes an outer tread-receiving portion 18, which is connected with the flange 15 by an intermediate portion 19, these intermediate portions having communicating continuous recesses 20 in their mutually adjacent faces which form a cushion-receiving chamber, the outer portion of the latter being closed by the tread portions 18, which lie in mutual engagement at their edges, and at their outer edges these tread portions have tire-receiving jaws 21, which when the bolts 16 are tightened are brought together to engage and hold therebetween a resilient tire 22, which is preferably formed of solid rubber.

It will be apparent that the outer casing 12 may be moved at any point toward the wheel proper, 5, to cause the felly 8 to extend into the cushion-passage, and located within this passage there is a continuous air-receiving tube 23, formed of rubber or other suitable material and provided with a strengthening-casing of fabric 24. This tube, as will be readily understood, forms a cushion which rests between the felly 8 and the tread portions 18 to hold the outer casing yieldably against inward movement. The tube 23 has projections 25 thereon, which are received in pockets 26, formed in the intermediate portions 19 of the sections 13 and 14 to prevent creeping of the tube within its chamber. Bolts 27 are engaged in the tread portions 18 of the section to aid in holding the latter together, and a valve 28 for the tube is provided which extends outwardly through a passage 29, formed in the intermediate portion of one of the sections of the outer casing.

A suitable lining of felt or similar material may be provided for the chamber, as shown at A.

What is claimed is—

1. The combination with a wheel including a felly having circumferentially-extending openings therein, of a casing including two sections disposed at opposite sides of the felly and extending oppositely therebeyond, attaching devices engaged in the sections and lying within the openings, said devices being arranged to permit of movement of the casing radially with respect to the wheel and circumferentially thereupon, means for holding the casing yieldably against circumferential movement in one direction, a cushion disposed between the sections outwardly of the wheel, jaws engaged between the sections upwardly of the cushion and extending there beyond, a resilient tire engaged between the jaws, and fastening devices engaged in the sections and in the jaws.

2. A wheel of the class described comprising a wheel proper including a felly having circumferentially-extending openings therein, an outer casing having a chamber therein and an inwardly-opening passage communicating with the chamber, said felly being movably disposed in the passage, devices engaged in the casing and lying within the openings of the felly for movement therewithin to permit of movement of different portions of the felly into and out of the chamber, and to permit of movement of the casing circumferentially of the wheel, springs engaged between the devices and one end of the openings to hold the devices yieldably at the other ends of the openings and a cushion located within the chamber of the casing to hold the felly yieldably against movement into the chamber.

3. A wheel of the class described comprising a wheel proper including a felly, an outer casing including two sections disposed against the sides of the felly and extending outwardly therebeyond, attaching devices engaged in the sections and in the felly and arranged to permit of movement of said portions with respect to each other, a cushion located between the sections outwardly of the felly and arranged to receive the latter thereagainst, jaws engaged between the sections outwardly of the cushion, fastening devices engaged in the sections and in the jaws, and a resilient tire engaged in the jaws.

In testimony whereof I affix my signature in presence of two witnesses.

GEORGE N. SHEPPARD.

Witnesses:
B. S. ARNOLD,
ALVIN SCHWAGER.